United States Patent [19]

Bertignoll et al.

[11] Patent Number: 4,817,164
[45] Date of Patent: Mar. 28, 1989

[54] ELECTROSTATIC DISCHARGE PROTECTOR FOR AN ELECTRET MICROPHONE

[75] Inventors: Friedrich Bertignoll; Mark W. Pocock, both of Ottawa, Canada

[73] Assignees: Northern Telecom Limited; Bell-Northern Research Limited, both of Quebec, Canada

[21] Appl. No.: 28,319

[22] Filed: Mar. 20, 1987

[51] Int. Cl.$^4$ ............................ H04R 1/28; H04R 7/18
[52] U.S. Cl. ......................................... 381/189; 381/169; 379/420; 379/437; 379/440; 307/400
[58] Field of Search ............... 381/154, 168, 169, 189, 381/188; 379/419, 420, 437, 440; 307/400

[56] References Cited

U.S. PATENT DOCUMENTS

| | | |
|---|---|---|
| 3,619,517 | 11/1971 | Bleazey . |
| 3,777,077 | 12/1973 | Johanson et al. . |
| 3,939,379 | 2/1976 | Sullivan et al. . |
| 3,947,646 | 3/1976 | Saito ........................................ 381/169 |
| 3,978,379 | 8/1976 | Del Vecchio . |
| 4,258,235 | 3/1981 | Watson . |
| 4,397,702 | 8/1983 | Klein et al. . |
| 4,424,419 | 1/1984 | Chaput et al. . |
| 4,471,493 | 9/1984 | Schober . |
| 4,533,795 | 8/1985 | Baumhauer, Jr. et al. . |

FOREIGN PATENT DOCUMENTS

WO86/06916 11/1986 PCT Int'l Appl. ................. 381/159

OTHER PUBLICATIONS

Fujita et al., Model S-1P Loudspeaker Telephone Set Design and Construction, Review of Electrical Communications Laboratories, vol. 27, Nos. 5-6 May, Jun. 1979.

Primary Examiner—John W. Caldwell, Sr.
Assistant Examiner—Tyrone Queen
Attorney, Agent, or Firm—Cushman, Darby & Cushman

[57] ABSTRACT

A holder for an electret microphone of the type having a front acoustic aperture and peripheral acoustic apertures is made of insulating material and includes a first sleeve portion of a diameter to receive the microphone snugly and a second sleeve portion of larger diameter. An internal stop limits the extent to which the microphone can be inserted such that the rear portion of the microphone projects into the second sleeve portion. Through holes in the second sleeve portion provide an acoustic passage to the peripheral acoustic apertures. The internal stop is in one embodiment formed by an apertured web. In another embodiment an internal shoulder forms the stop but in that embodiment too an apertured web is provided. A concentric small cylinder extends from the web in that case and terminates short of the shoulder. In either embodiment, a rectangular plate is molded with the sleeves and this forms the cover of a microphone enclosure. The invention retains or enhances the acoustic response of conventional mounting system while providing protection against electrostatic discharge.

15 Claims, 4 Drawing Sheets

A - ORIGINAL FOAM MNT.
B - EMBODIMENT 1
C - EMBODIMENT 2

ELECTROSTATIC DISCHARGE PROTECTOR FOR AN ELECTRET MICROPHONE

This invention relates to electret condenser microphones and, in particular, to such microphones in telephone sets.

In recent telephone sets provided with hands free facility, an electret microphone is positioned behind louvres within an enclosure in the moulded plastics integral cover of the set. To provide an acceptable acoustic response the microphone is surrounded by acoustic foam. More particularly, a rectangular block of polyurethane foam is received in the enclosure and the microphone is, in turn, received within a cylindrical bore in the rectangular block.

One difficulty that is encountered with such an arrangement is that of electrostatic discharge from the user (usually via the hand) of the telephone to the metal body of the microphone or to the metallized microphone membrane or microphone metal back plate or to the microphone lead wires. It has been found that electrostatic charges of 20 kilovolts or more can easily accumulate on a person working in modern office environments particularly where extensive use is made of synthetic carpeting. Not only is such a discharge uncomfortable but also it can cause temporary malfunctioning of the telephone or permanent damage to the microphone or other electrical components within the set.

It is an object of the present invention to shield the microphone from electrostatic discharge while retaining or enhancing the good acoustic properties available in foam surrounded microphones.

According to one aspect of the invention, there is provided a sleeve for supporting and shielding from electrostatic discharge an electret microphone, the sleeve being made of insulating material and comprising at least two generally coaxial, adjoining, open-ended sleeve portions, a first one of the sleeve portions having a relatively small internal diameter substantially identical to the external diameter of the microphone to be installed and a second one of the sleeve portions having a relatively large internal diameter, stop means located within the first sleeve portion to limit the extent to which the microphone can be inserted within the first sleeve portion such that a rear portion of the microphone will project into the second sleeve portion, and at least one aperture extending through the second sleeve portion to provide an acoustic passage to the rear portion of the microphone when installed.

According to another aspect of the invention there is provided a sleeve for supporting and shielding from electrostatic discharge a condenser microphone, the sleeve being made of insulating material and comprising a generally rectangular plate portion for forming a cover of a microphone enclosure, at least two generally coaxial, adjoining, open-ended sleeve portions attached to the one side of the plate portion such that the sleeve portions have a central axis which is substantially parallel to the plane of the plate portion and the sleeve portions are contained completely within the rectangular confines of the plate portion, one of the sleeve portions having a relatively small internal diameter substantially identical to the external diameter of the microphone to be installed and the other sleeve portion having a relatively large internal diameter, stop means located within the first sleeve portion to limit the extent to which the microphone can be inserted within the first sleeve portion such that a rear portion of the microphone will project into the second sleeve portion, and at least one aperture extending through the second sleeve portion to provide an acoustic passage to the rear portion of the microphone when installed.

The invention will now be described in greater detail with reference to the accompanying drawings, in which.

Figure 1:
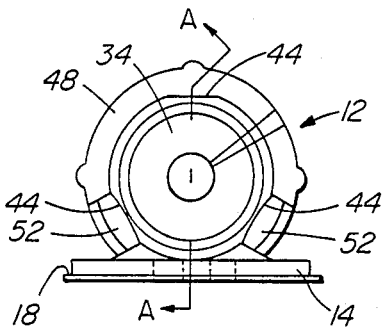
FIG. 1 is a front view of a shielding microphone holder according to the invention.
Figure 2:
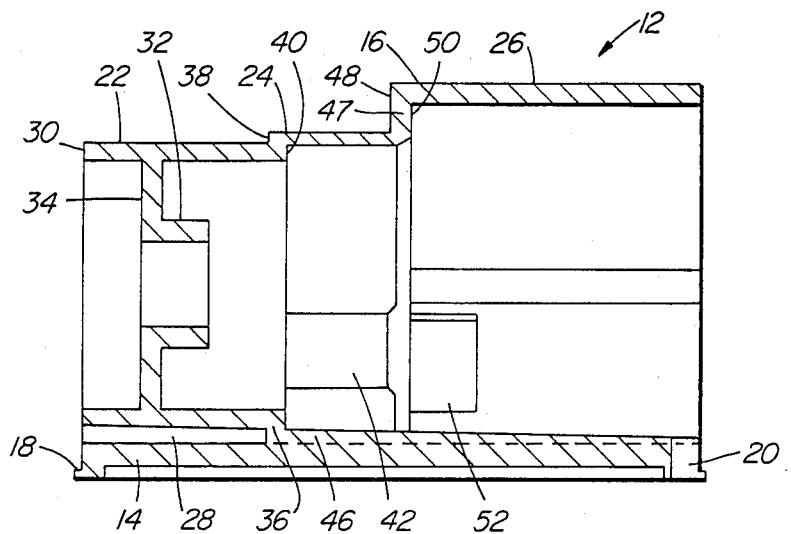
FIG. 2 is a sectional view to a larger scale taken on section line A—A of FIG. 1.

Referring firstly to FIGS. 1 and 2, a shielding microphone holder 12 is moulded from an electrically insulating plastics material such as an ABS type 4 available from BORG WARNER under the trade name CYCOLAC-T. The holder 12 comprises a generally rectangular plate portion 14 and a stepped sleeve portion 16, joined to one surface of the plate portion 14 such that the central axis of the cylindrical portion 16 is aligned directly above the longer axis of symmetry of the plate portion. The dimensions of the sleeve portion 16 are such that it is located completely within the rectangular confines of the plate portion 14.

Plate portion 14 has a recessed edge or flange 18 extending completely around its periphery and on its rear (as seen in FIG. 1) shorter edge has two spaced notches 20 which extend completely through the plate portion.

Sleeve portion 16 can be subdivided into three successive thin-walled, open-ended coaxial cylinders 22, 24 and 26. Cylinder 22 is located at the forward end of cylindrical portion 16 and is spaced from plate portion 14 along its length, the space between cylinder 22 and plate portion 14 being designated 28 in FIG. 2. Approximately one third of the way along cylinder 22 from the forward open end 30 thereof there is located the leading end of a concentric thin-walled open-ended cylinder 32 having an outside diameter less than half the outside diameter of cylinder 22. Cylinder 32 extends concentrically within cylinder 22 almost one third of the length of cylinder 22 and is joined thereto by an annular web 34 extending radially outwardly from the leading end portion of cylinder 32.

The trailing end 36 of cylinder 22 merges with the forward end of cylinder 24 which has a slightly larger external and internal diameter than cylinder 22, thereby providing an external step 38 and an internal shoulder 40. The internal surface of cylinder 24 is not perfectly cylindrical but is provided with three circumferentially spaced flats or lands 42, one of which is illustrated in FIG. 2, which have the effect of reducing the internal diameter of cylinder 24. Aligned with the lands 42 but on the external surface of cylinder 24 are corresponding lands 44 particularly illustrated in FIG. 1. Cylinder 24 is not a complete cylinder because it merges along a lower portion thereof with plate portion 14 as illustrated at 46 in FIG. 2.

Third cylinder 26 has a forward end which joins the trailing end of cylinder 24 because the external and internal diameters of cylinder 26 are considerably greater than those of cylinder 24, a generally annular, radially extending wall 47 connects cylinder 26 to cylinder 24 and this wall defines an external step 48 and an internal shoulder 50. As can be seen in FIG. 1 two generally rectangular holes or slots 52 extend through wall 47 from external step 48 to internal shoulder 50, the slots being located adjacent the two lowermost lands 44 on cylinder 24. Third cylinder 26 is even less a complete cylinder than cylinder 24 because its larger diameter means that its lower portion intersects rather than merges with the plate portion 14.

Figure 3:
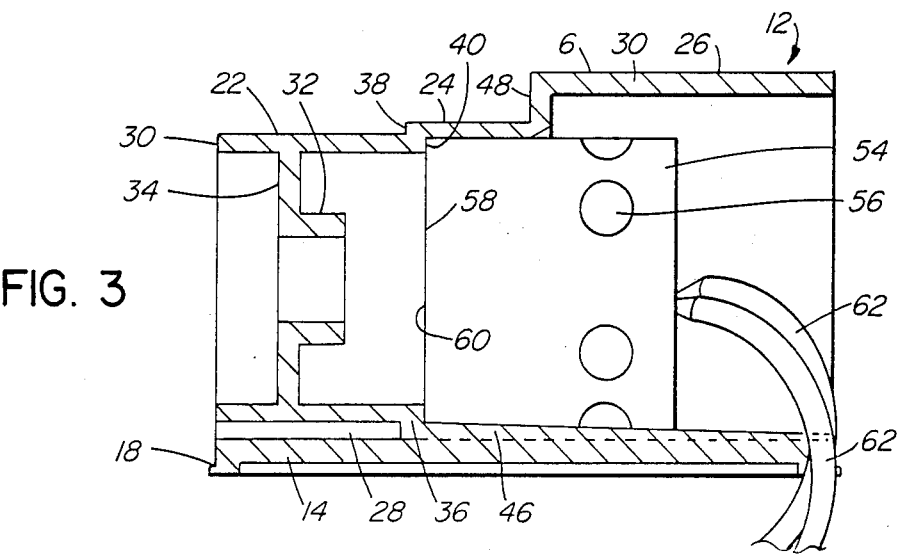
FIG. 3 is a view similar to FIG. 2 but showing an electret microphone in position within the holder.

Referring now to FIG. 3, this shows an electret microphone 54 positioned in holder 12. A suitable microphone cartridge is obtainable from PRIMO MICROPHONE INC and comprises a cylindrical aluminum body having a plurality of circumferential acoustic holes 56 and a single acoustic hole indicated at 58 in the middle of the front surface. Hole 58 is covered by a thin acoustic cloth pad 60 which is adhered to and covers substantially the whole front surface of the microphone. Two insulated output wires 62 extend from a soldered connection on the rear surface of the microphone. The circumferential holes 56 permit pressure waves to reach the rear as well as the front of the acoustic membrane, the path to the rear being longer and for that reason, the microphone cartridge has uni-directional characteristics.

The microphone is inserted axially into holder 12 via cylinder 26 until the front surface of the microphone engages shoulder 40 of cylinder 24. Shoulder 49 thus acts as a stop to limit the extent to which the microphone can be inserted within cylinder 24. In the fully inserted position, it can be seen that a rear portion of the microphone projects into the cylinder 26 and the entire microphone is contained within the sleeve 16. The lands 42 in cylinder 24 provide a good interference fit between the cylindrical body of the microphone and the holder thereby retaining the microphone securely in the holder. In the fully inserted position, it can be seen that the holes 56 are spaced rearwardly of shoulder 50 between cylinders 24 and 26. Thus, slots 52 provide an acoustic passage from outside holder 12 to holes 56 while hole 58 is in direct acoustic communication with the environment via the bores of cylinders 22 and 32.

Figure 4:
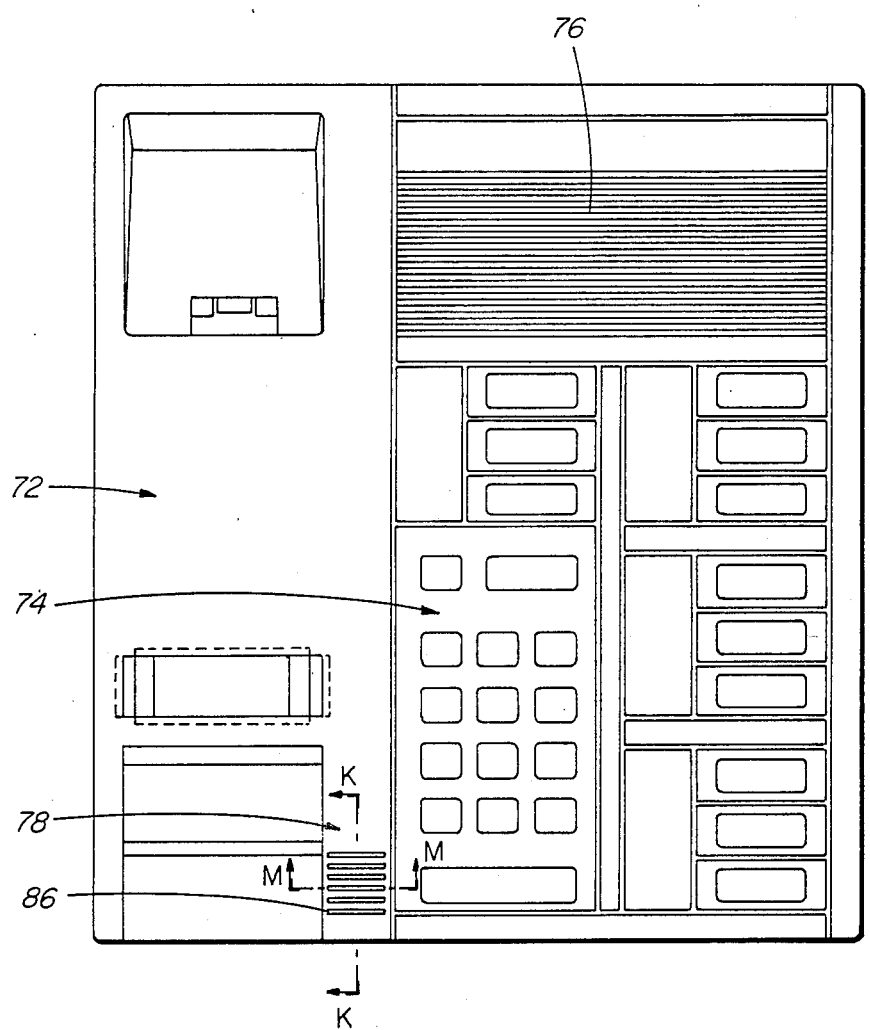
FIG. 4 is a plan view of the cover of a telephone set having an enclosure for housing a hands-free microphone.
Figure 5:
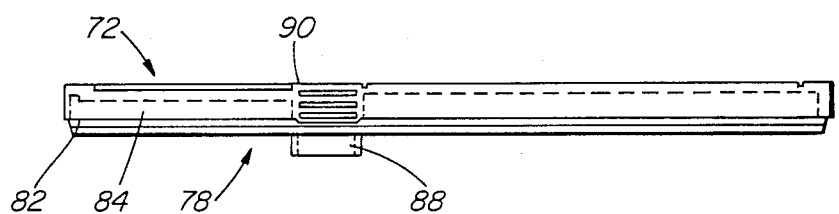
FIG. 5 is a front view of the cover of FIG. 4.
Figure 6:
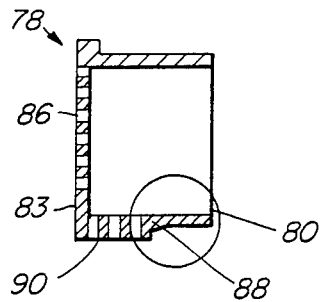
FIG. 6 is a sectional view to a larger scale taken on line K—K of FIG. 4.
Figure 7:
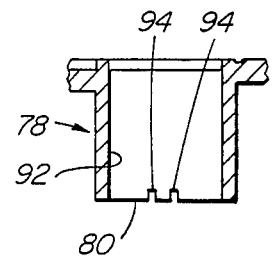
FIG. 7 is a sectional view to a larger scale taken on line M—M of FIG. 4.

FIG. 4 shows the cover 70 of a telephone set for which the microphone holder of the invention is designed. The cover is moulded plastics and may be, for example, ABS type T available from Borg Warner under the trade name CYCOLAC-T. The cover 70 includes a cradle, generally designated 72, for holding the telephone handpiece (not shown), a keyboard portion 74 for receiving dial and function keys, a speaker grill 76 for hands-free operation and a microphone enclosure 78 also for hands-free operation. As the invention is particularly concerned with the microphone enclosure 78 no further description of other parts of the cover 70 will be given.

As seen in FIGS. 4-7, microphone enclosure 78 takes the form of a rectangular box which extends downwardly from the under surface of cover 72 to terminate at an open lower end 80 which is below the lower extremity 82 of the adjacent end wall 84 of cover 72. The upper end 83 of the enclosure 72, i.e., the end remote from open end 80 is provided with slots or louvres 86 extending through the thickness of the cover to the upper side thereof. Three of the four side walls of enclosure 72 are essentially complete but the remaining one, referenced 88, which is essentially flush with end wall 84 of the cover is also provided with slots or louvres 90 extending through end wall 84. The enclosure side wall 92 which is opposite wall 88 is provided with two spaced notches 94 (best seen in FIG. 7) opening onto the lower end 80 of the enclosure.

Figure 8:
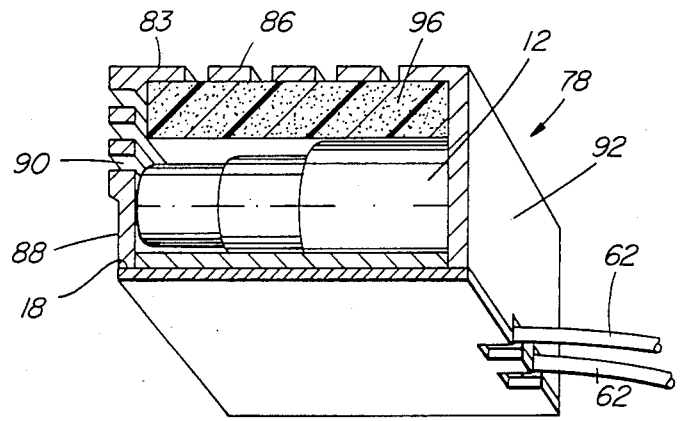
FIG. 8 is a view showing the microphone and holder assembled to the cover of the telephone set.

FIG. 8 shows the holder 12 and microphone mounted in microphone enclosure 78. Plate portion 14 is sized to fit with slight interference in the open end 80 of the enclosure with the recessed flange 18 accommodating the thickness of the enclosure. Microphone wires 62 extend through notches 94 in side wall 92 of enclosure 72, the notches being slightly narrower than the wires to hold them in place. In alternative arrangements the wires could instead be received through notches 20 in plate portion 14. When in position within the enclosure, holder 12 is aligned such that the opening leading to cylinder 22 is adjacent wall 88 with the louvres 90 located higher than such opening. The space between the holder 12 and louvred wall 83 is preferably filled with a polyurethane foam slab 96 to improve the acoustic response. Thus, slab 96 covers both louvres 86 and 90. To complete the assembly and provide sealing an adhesively backed foam strip (not shown) is mounted over plate portion 14.

Figure 9:
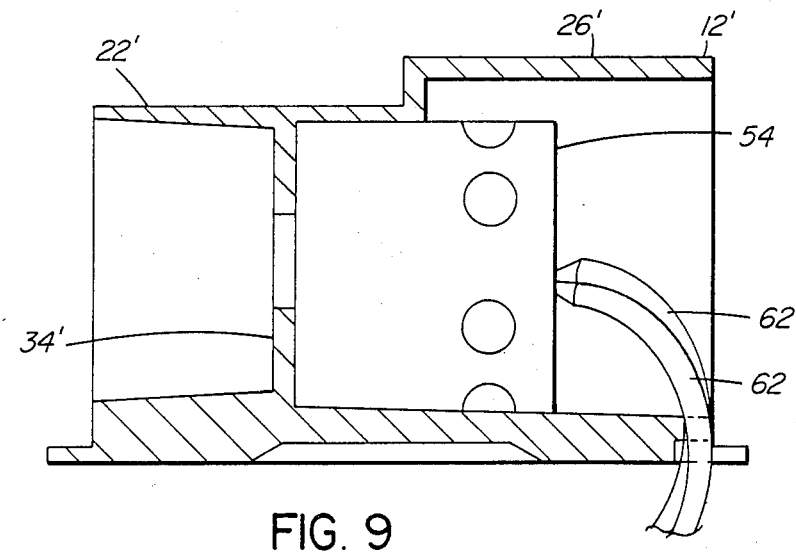
FIG. 9 is an axial sectional view of an alternative embodiment of shielding microphone holder according to the invention and electret microphone received in the holder.

The configuration illustrated in FIGS. 1 and 2 is only one of many potential designs for the microphone holder according to the invention. FIG. 9 shows an alternative design in which there are only two cylinders 22' and 26', there being no counterpart to middle cylinder 24. Furthermore, although there is an annular web 34' which has a central aperture, there is no counterpart to concentric cylinder 32. Thus, in this embodiment web 34' is provided essentially for ESD protection whereas, in the first embodiment, the web 34 additionally for use with cylinder 32 an acoustic tuning chamber. When inserted, the microphone front surface abuts web 34', not shoulder 40' located at the junction of cylinders 22' and 26'. In this embodiment the holes which correspond to rectangular holes 52 of the first embodiment one circular and smaller in area but their function is the same. In all other important aspects, holder 12' is similar to holder 12.

Figure 10:
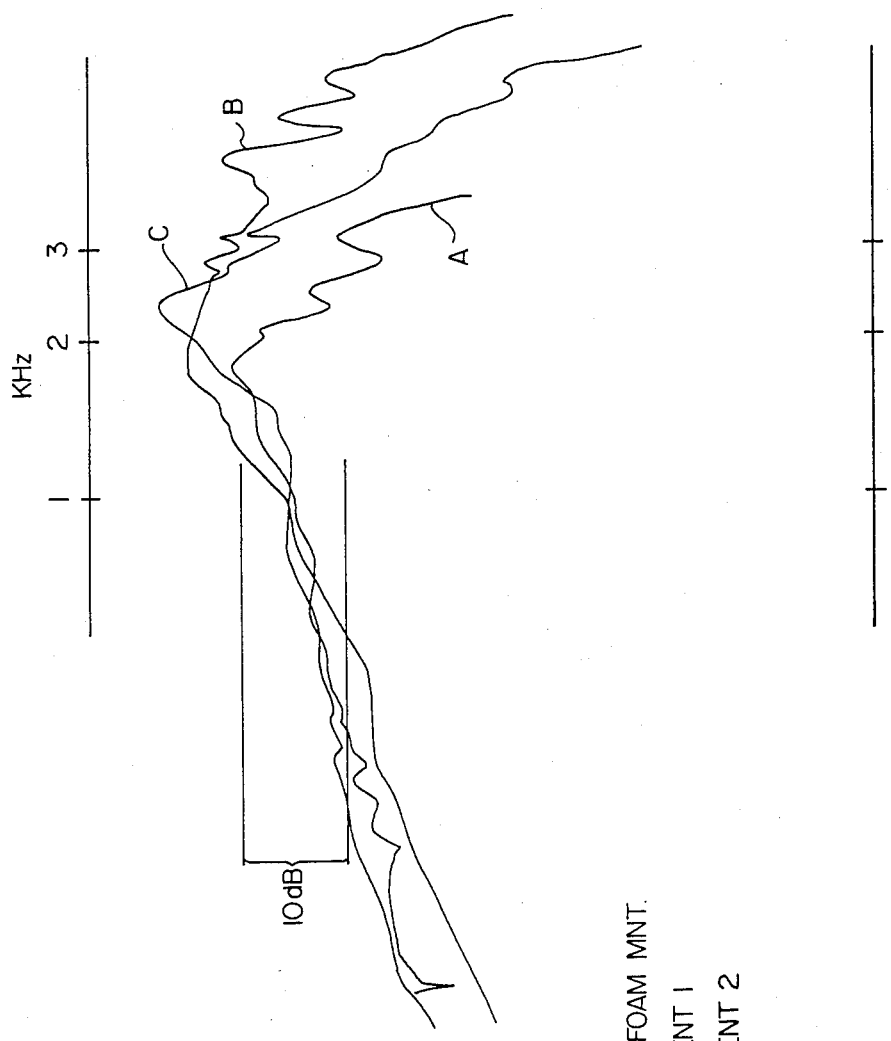
FIG. 10 is a graph providing a comparison between the microphone response when conventionally foam mounted and the microphone response when mounted according to the two embodiments of the invention.

FIG. 10 illustrates frequency response curves A, B and C corresponding respectively, to the case where the microphone is secured in the conventional foam mount, in the holder 12 or holder 12' and demonstrates that the frequency response of the microphone using the inventive arrangement is not markedly different from that achieved by the conventional foam mount. On the other hand holder 12 or 12' is able to protect the microphone from electrostatic discharge from an external source in contact with the outer surface of cover 72 up to a value of approximately 20 kvolts. It should be apparent that the precise shaping of the acoustic response is achieved by factors such as the size and number of apertures 52 or 52', the presence or absence of tuning chambers, the parameters of the louvred enclosure and so on.

Various modifications to the embodiments of the invention specifically described above should be considered to fall within the scope of the invention. For example the shape of the holes 52 need not be rectangular or circular and, indeed, they could be arranged to extend radially through the wall of cylinder 26 or 26' instead of axially. Corresponding changes in dimensions or configuration of other parts of the holder might, of course, have to be made to compensate for such changes in the shape or disposition of holes 57.

Furthermore, web 34 or 34' could be reduced in size or possibly eliminated if the forwarded end of the microphone could be secured as a sufficient distance from the open end 30 of cylinder 22.

The rectangular cover for the microphone enclosure is, as illustrated in the two embodiments specifically described, integral with the cylindrical sleeve portions and such an integral arrangement has manufacturing and assembly advantageous over arrangement in which the rectangular cover is separate from the sleeve but this latter arrangement is also considered within the scope of the invention.

We claim:

1. A sleeve for supporting and shielding from electrostatic discharge an electret microphone installed within said sleeve, the sleeve being made of insulating material and comprising at least two generally coaxial, adjoining, open-ended sleeve portions, a first one of the sleeve portions having a relatively small internal diameter substantially identical to the external diameter of the microphone to be installed and a second one of the sleeve portions having a relatively large internal diameter, stop means located within the first sleeve portion and arranged to abut a front surface portion of the microphone to limit the extent to which the microphone can be inserted within the first sleeve portion via the second sleeve portion such that a rear portion of the microphone will project into the second sleeve portion with the entire microphone contained within the sleeve, and at least one aperture extending through the second sleeve portion to provide an acoustic passage to the rear portion of the microphone when installed.

2. A sleeve according to claim 1 wherein the stop means comprises a web extending across the first sleeve portion, the web having a substantially central aperture.

3. A sleeve according to claim 2 wherein the at least one aperture extending through the second sleeve portion passes axially through a radially extending wall joining adjacent ends of the first and second sleeve portions.

4. A sleeve according to claim 1 wherein a web extends across the first sleeve portion, the web having a substantially central aperture, and a further sleeve portion located at the central aperture extends concentrically with respect to the first sleeve portion towards the second sleeve portion stopping short of the stop means.

5. A sleeve according to claim 4 wherein the at least one aperture extending through the second sleeve portion passes axially through a radially extending wall joining adjacent ends of the first and second sleeve portions.

6. A sleeve for supporting and shielding from electrostatic discharge an electret condenser microphone installed within said sleeve, the sleeve being made of insulating material and comprising a generally rectangular plate portion for forming a cover of a microphone enclosure, at least two generally coaxial, adjoining, open-ended sleeve portions attached to the one side of the plate portion such that the sleeve portions have a central axis which is substantially parallel to the plane of the plate portion and the sleeve portions are contained completely within the rectangular confines of the plate portion, a first one of the sleeve portions having a relatively small internal diameter substantially identical to the external diameter of the microphone to be installed and a second one of the sleeve portions having a relatively large internal diameter, stop means located within the first sleeve portion and arranged to abut a front surface portion of the microphone to limit the extent to which the microphone can be inserted within the first sleeve portion via the second sleeve portion such that a rear portion of the microphone will project into the second sleeve portion with the entire microphone contained within the sleeve portions, and at least one aperture extending through the second sleeve portion to provide an acoustic passage to the rear portion of the microphone when installed.

7. A sleeve according to claim 6 wherein the stop means comprises a web extending across the first sleeve portion, the web having a substantially central aperture.

8. A sleeve according to claim 7 wherein the at least one aperture extending through the second sleeve portion passes axially through a radially extending wall joining adjacent ends of the first and second sleeve portions.

9. A sleeve according to claim 8 wherein there are two apertures axially extending through the radially extending wall, both apertures being circular.

10. A sleeve according to claim 6 wherein a web extends across the first sleeve portion, the web having a substantially central aperture, and a further sleeve portion located at the central aperture extends concentrically with respect to the first sleeve portion towards the second sleeve portion stopping short of the stop means.

11. A sleeve according to claim 10 wherein the at least one aperture extending through the second sleeve portion passes axially through a radially extending wall joining adjacent ends of the first and second sleeve portions.

12. A sleeve according to claim 11 wherein there are two apertures axially extending through the radially extending wall, both apertures being rectangular.

13. A sleeve according to claim 6 wherein the plate portion has two notches spaced along one edge for accommodating a pair of lead wires of a microphone when installed.

14. A sleeve according to claim 6 in combination with a microphone enclosure having four sides, an upper end and a lower end in which the lower end is open, the upper end has louvres and one of the sides has louvres, wherein, in use, the rectangular plate portion forms a cover for the open lower end of the enclosure with the open end of the first sleeve portion adjacent the louvred side.

15. The combination according to claim 14 wherein a piece of acoustic foam is located in the enclosure to fill substantially a space provided between the sleeve portions and the louvred end.

* * * * *